R. H. SIETSEMA.
DISH DRAINER.
APPLICATION FILED AUG. 2, 1915.
1,183,248.
Patented May 16, 1916.
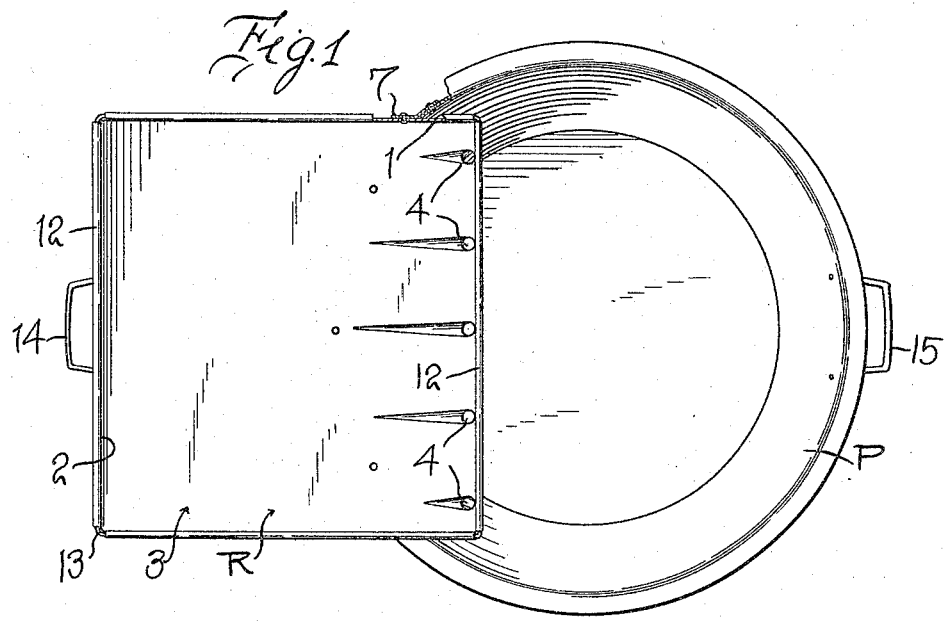
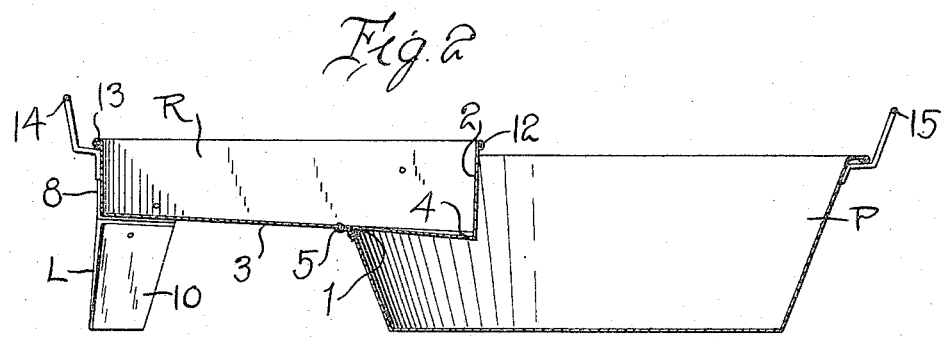
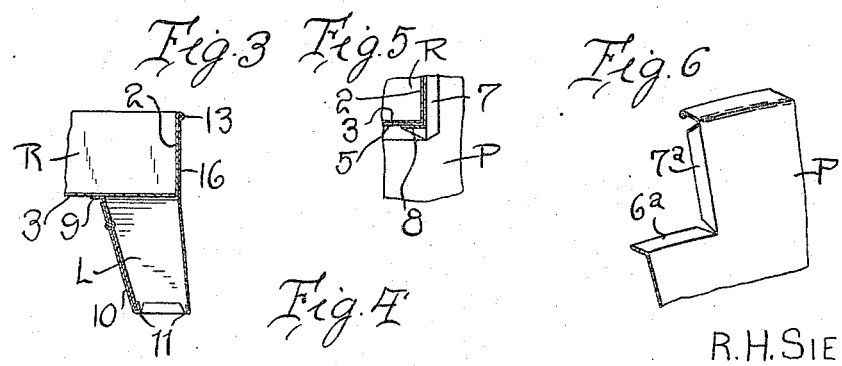
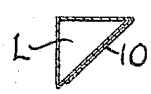
Inventor
R. H. SIETSEMA
By Watson E. Coleman
Attorney

UNITED STATES PATENT OFFICE.

REMMER H. SIETSEMA, OF LITTLE ROCK, IOWA, ASSIGNOR OF ONE-HALF TO HARRY C. NELSON, OF LITTLE ROCK, IOWA.

DISH-DRAINER.

1,183,248.  Specification of Letters Patent.  Patented May 16, 1916.

Application filed August 2, 1915.  Serial No. 43,201.

*To all whom it may concern:*

Be it known that I, REMMER H. SIETSEMA, a citizen of the United States, residing at Little Rock, in the county of Lyon and State of Iowa, have invented certain new and useful Improvements in Dish-Drainers, of which the following is a specification, reference being had to the accompanying drawings.

This invention relates to certain improvements in dish drainers, and it is an object of the invention to provide a device of this general character including a drain receptacle permanently secured to a pan or other vessel and partially intersecting the same, said receptacle being provided with openings in communication with the pan or vessel.

The invention consists in the details of construction and in the combination and arrangement of the several parts of my improved dish drainer whereby certain important advantages are attained and the device is rendered simpler, less expensive and otherwise more convenient and advantageous for use, all as will be hereinafter more fully set forth.

The novel features of the invention will be carefully defined in the appended claim.

In order that my invention may be the better understood, I will now proceed to describe the same with reference to the accompanying drawings, wherein—

Figure 1 is a view in top plan of the device as herein embodied, with a portion broken away; Fig. 2 is a longitudinal sectional view taken through the device as disclosed in Fig. 1; Fig. 3 is a fragmentary detail sectional view illustrating a supporting leg as herein embodied; Fig. 4 is a horizontal sectional view taken through the supporting leg as herein embodied; Fig. 5 is a fragmentary view, partly in bottom plan and partly in section, illustrating a connection between the receptacle and pan as herein embodied; and Fig. 6 is a fragmentary view in perspective illustrating a further embodiment of my invention.

As disclosed in the accompanying drawings, P denotes a conventional flaring pan or vessel having an upper marginal portion cut-away, as at 1, and extending through said cut-away portion and partially intersecting the pan or vessel is the drain receptacle R preferably rectangular in form and having the upstanding marginal flanges 2 with the bottom 3 thereof disposed on an incline toward the pan or vessel so that the fluid collected within the receptacle will flow toward the pan and be discharged therein through the perforations 4 produced in the bottom 3 of the pan adjacent the inner flange 2. By having the openings 4 so positioned it will be perceived that the user is protected against having the returning fluid when hot scalding the hand of the user. The lower marginal edge of the cut-out portion 1 is defined by the outstanding flange 5 adapted to be suitably secured to the under surface of the bottom of the receptacle R and said flange may be separable strip of material or may be integrally formed with the pan or vessel P, as indicated at 6ª in Fig. 6.

The side margins of the cut-out portion 1 are also defined by the outstanding flanges 7 adapted to overlie the side walls 2 of the receptacle R and be suitably secured thereto, said flanges being further provided with the horizontal extensions 8 adapted to underlie the bottom 3 of the receptacle and be suitably secured thereto. As disclosed in Fig. 6, the flanges 7ª may also be integrally formed with the pan. The outer extremity of the receptacle R is supported by the legs L, said legs being herein disclosed as formed of a single sheet of material with the lower portions thereof substantially triangular in form, two of the side walls of each of said legs being provided with the upstanding extensions 16 overlying the flanges 2 at a corner of the receptacle and being suitably secured thereto while the remaining wall of the leg is provided with the outstanding flange 9 adapted to be suitably secured to the under surface of the bottom 3. It is to be observed that this latter wall 10 of the leg comprises two plies of material suitably secured one to the other so that said supporting leg may possess additional strength. It is also to be observed that the lower marginal portions of the legs are curled inwardly, as at 11, to prevent said legs from marring or otherwise injuring the surface with which they contact. The upper edges of the receptacle R are curled to form the beads 12 reinforced by the wire 13 and said receptacle is provided with a handle member 14 preferably in longitudinal alinement with the handle member 15 suitably connected with the pan or vessel P.

As illustrated in Fig. 1, the bottom 3 of the receptacle may be corrugated, with the corrugations extending toward the pan and it is to be observed that said corrugations are in communication with the perforations 4.

While my improved device is primarily intended for use as a dish drainer, it may be used for many other purposes. Vegetable or fruit may be placed in the receptacle R to be cleansed; fowls may be placed therein to be scalded previous to being picked; and butter may be placed therein when taken out of the churn to be kneaded to work out the butter-milk. These are only a few of the many usages to which my improved device may be put.

From the foregoing description, it is thought to be obvious that a dish drainer constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

In combination with a vessel, a supporting leg therefor formed of a single sheet of material, with the lower portions thereof substantially triangular in form, the side margins of the leg overlapping and secured one to the other to afford a wall of double thickness, the lower marginal portions of the leg being curled inwardly, the side walls of the leg consisting of only a single ply of material being provided with upstanding extensions overlying the sides of the receptacle at the corner thereof, the inner ply of the remaining wall being provided with an outstanding flange secured to the under surface of the vessel.

In testimony whereof I hereunto affix my signature in the presence of two witnesses.

REMMER H. SIETSEMA.

Witnesses:
 A. CHRISTIANS,
 ED UNDERHILL.

Copies of this patent may be obtained for five cents each, by addressing the "Commissioner of Patents, Washington, D. C."